US012378086B2

(12) United States Patent
Marcet et al.

(10) Patent No.: US 12,378,086 B2
(45) Date of Patent: Aug. 5, 2025

(54) AUTOMATED CELL FOR PERFORMING CONTAINER CONTROL DURING A PROCESS OF PICKING RUBBER BLOCKS

(71) Applicant: COMPAGNIE GENERALE DES ETABLISSEMENTS MICHELIN, Clermont-Ferrand (FR)

(72) Inventors: Gregory Marcet, Clermont-Ferrand (FR); Gwenael Favro, Clermont-Ferrand (FR); Maxime Tarrit, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 880 days.

(21) Appl. No.: 17/461,565

(22) Filed: Aug. 30, 2021

(65) Prior Publication Data

US 2021/0387359 A1    Dec. 16, 2021

(30) Foreign Application Priority Data

Feb. 23, 2021    (FR) ........................................ 2101752

(51) Int. Cl.
*B65G 65/23*    (2006.01)
*B23Q 7/00*    (2006.01)
*B23Q 7/04*    (2006.01)
*B60D 1/58*    (2006.01)
*B65G 47/14*    (2006.01)
(Continued)

(52) U.S. Cl.
CPC ............. *B65G 65/23* (2013.01); *B23Q 7/00* (2013.01); *B23Q 7/043* (2013.01); *B65G 47/1478* (2013.01); *B65G 57/28* (2013.01); *B65G 61/00* (2013.01); *B60D 1/58* (2013.01)

(58) Field of Classification Search
CPC .... B25J 15/0253; B25J 13/087; B25J 9/0009; B29C 31/006; B07C 5/3422; B65G 47/1478; B65G 59/00; B65G 65/00; B65G 61/00; B65G 57/28; B60D 1/58; B60R 9/06; B23Q 7/043; B23Q 7/00
See application file for complete search history.

(56) References Cited

U.S. PATENT DOCUMENTS 5,281,081 A     1/1994   Kato
6,682,292 B2 *  1/2004   Estes ................... B60R 9/10
                                                 414/427
(Continued)

FOREIGN PATENT DOCUMENTS

CN    205837747 U    12/2016
CN    106742061 A    5/2017
(Continued)

*Primary Examiner* — Thomas Randazzo
(74) *Attorney, Agent, or Firm* — VENABLE LLP

(57) ABSTRACT

The invention relates to an automated cell (100) for handling containers in which rubber blocks are arranged. The cell includes: a frame that allows the fixed installation of the cell; an automatic centering system having a guiding means that allows precise positioning of a loaded container in a loading space (112) of the cell; a clamping system having a holding means that maintains the positioning of the loaded container in the loading space of the cell; and a locking system having a locking means that maintains the positioning of the container in the loading space of the cell.

6 Claims, 6 Drawing Sheets

(51) Int. Cl.
   *B65G 57/28*   (2006.01)
   *B65G 61/00*   (2006.01)

(56) References Cited

U.S. PATENT DOCUMENTS

| | | | |
|---|---|---|---|
| 8,172,498 B2* | 5/2012 | Enenkel | B65G 65/23 |
| | | | 414/811 |
| 9,394,145 B2 | 7/2016 | Yada et al. | |
| 10,766,701 B2* | 9/2020 | Manley | B65G 1/07 |
| 11,905,116 B2* | 2/2024 | Arase | B25J 9/0093 |
| 2002/0070640 A1* | 6/2002 | Hamilton | E05C 9/043 |
| | | | 312/216 |
| 2012/0031808 A1 | 2/2012 | Cavallini | |
| 2014/0244026 A1 | 8/2014 | Neiser | |
| 2015/0274491 A1 | 10/2015 | Yada et al. | |
| 2015/0290805 A1 | 10/2015 | Morency et al. | |
| 2017/0348854 A1 | 12/2017 | Oleynik | |
| 2018/0050451 A1 | 2/2018 | Takanishi et al. | |
| 2020/0254651 A1 | 8/2020 | Tournebize et al. | |
| 2020/0283241 A1 | 9/2020 | Quaglia et al. | |
| 2021/0233018 A1 | 7/2021 | Astier | |
| 2021/0387817 A1 | 12/2021 | Favro et al. | |
| 2022/0055837 A1 | 2/2022 | Marcet et al. | |

FOREIGN PATENT DOCUMENTS

| | | | | |
|---|---|---|---|---|
| CN | 206840077 U | | 1/2018 | |
| CN | 108527322 A | | 9/2018 | |
| CN | 208021776 U | | 10/2018 | |
| CN | 110713019 A | | 1/2020 | |
| CN | 210417931 U | | 4/2020 | |
| CN | 112407741 A | | 2/2021 | |
| DE | 102019207401 A1 | | 11/2020 | |
| EP | 1829804 A2 | * | 9/2007 | B07C 1/025 |
| EP | 3442764 A1 | | 2/2019 | |
| FR | 2971237 A | | 8/2012 | |
| GB | 1196918 A | * | 7/1970 | B65G 65/23 |
| JP | 10-297768 A | | 11/1998 | |
| JP | 2005-297091 A | | 10/2005 | |
| JP | 2006240837 A | * | 9/2006 | |
| JP | 2009-172720 A | | 8/2009 | |
| JP | 2018-27581 A | | 2/2018 | |
| WO | 2010/057898 A1 | | 5/2010 | |
| WO | 2019/193272 A1 | | 10/2019 | |
| WO | 2020/025868 A1 | | 2/2020 | |

* cited by examiner

[Fig 1]
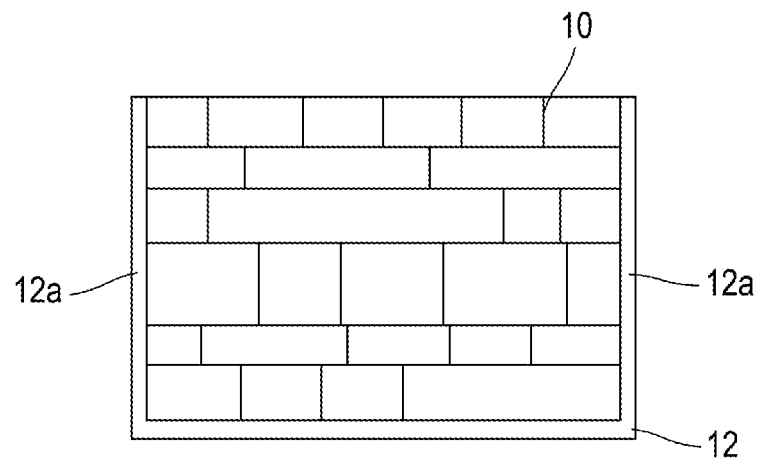
[Fig 2]
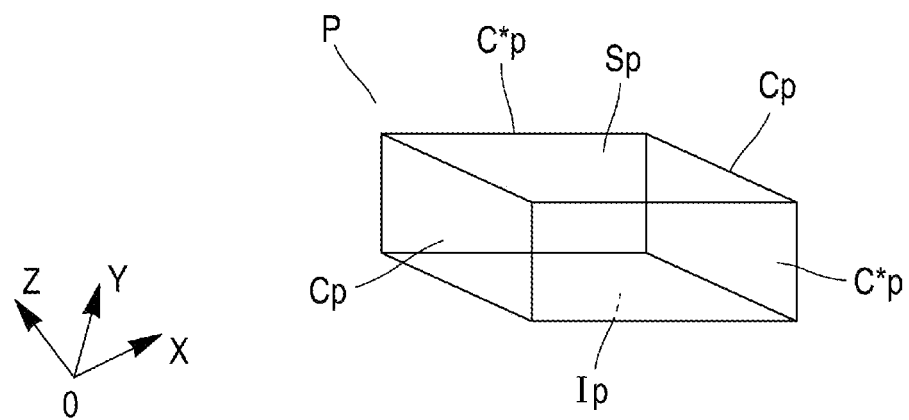

[Fig 3]
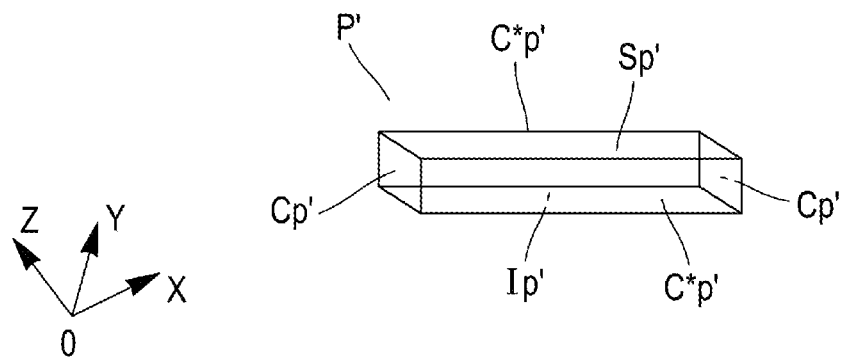
[Fig 4]
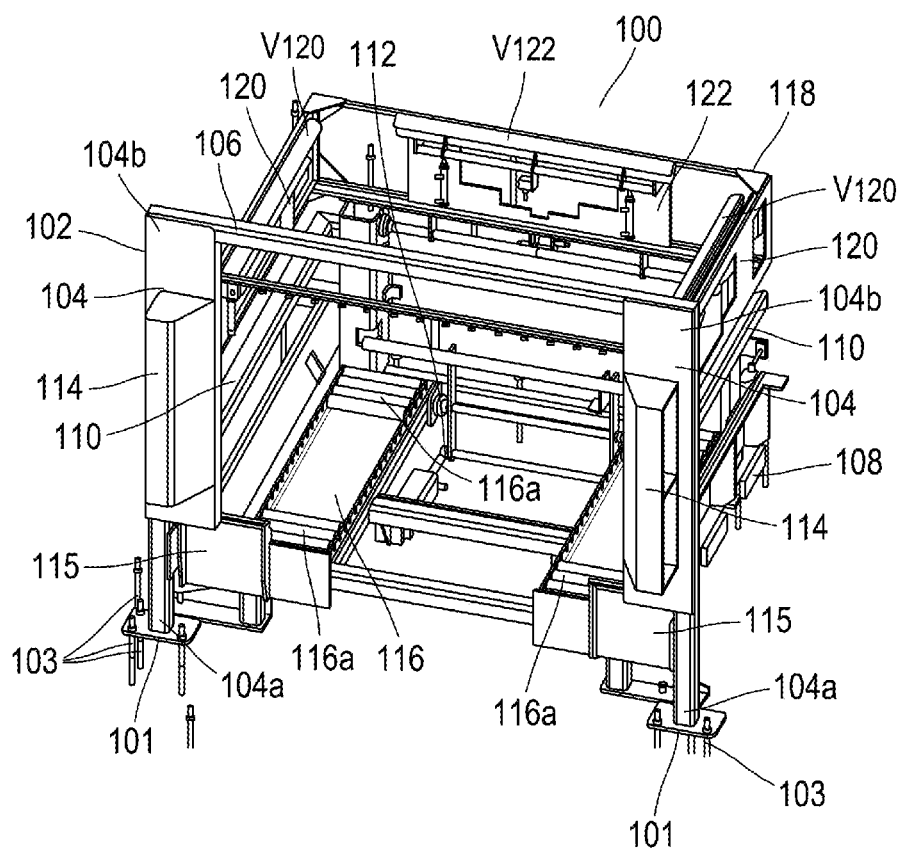

[Fig 5]
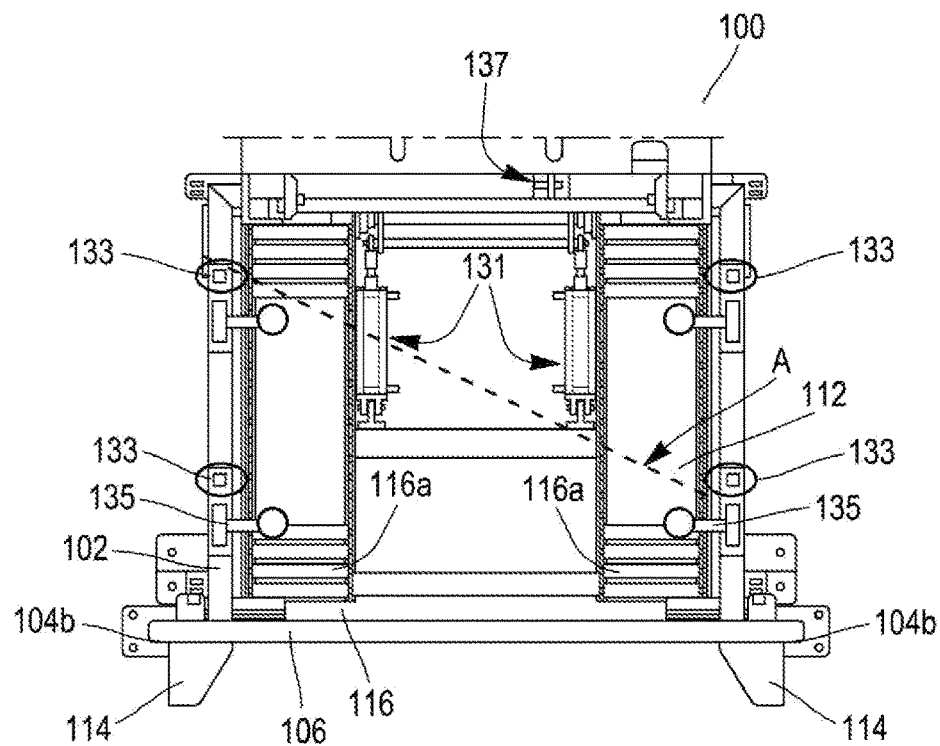
[Fig 6]
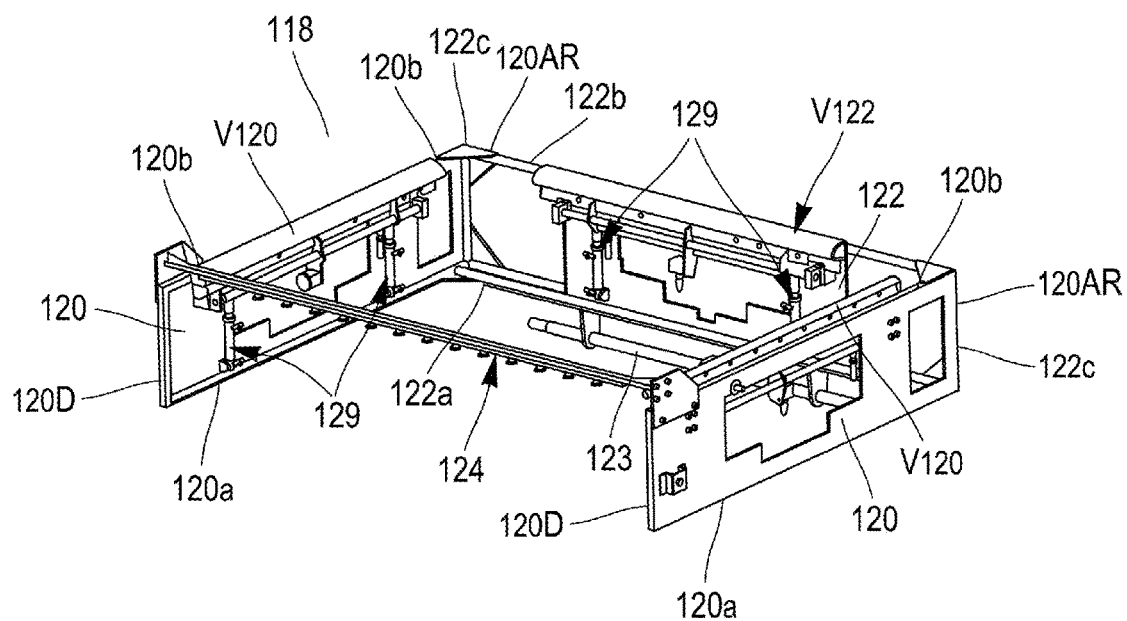

[Fig 7]
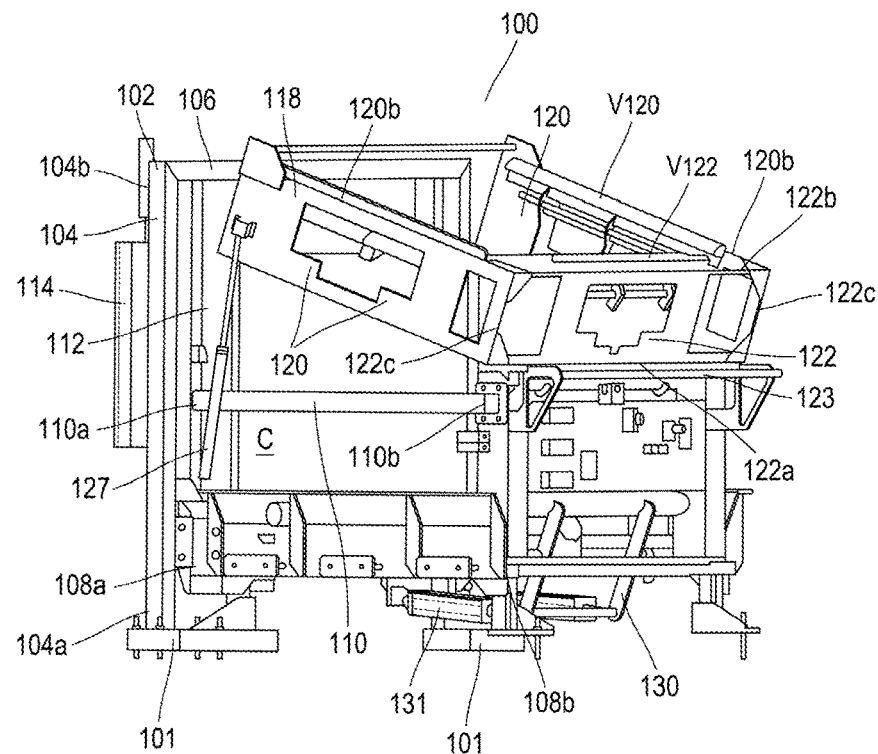
[Fig 8]
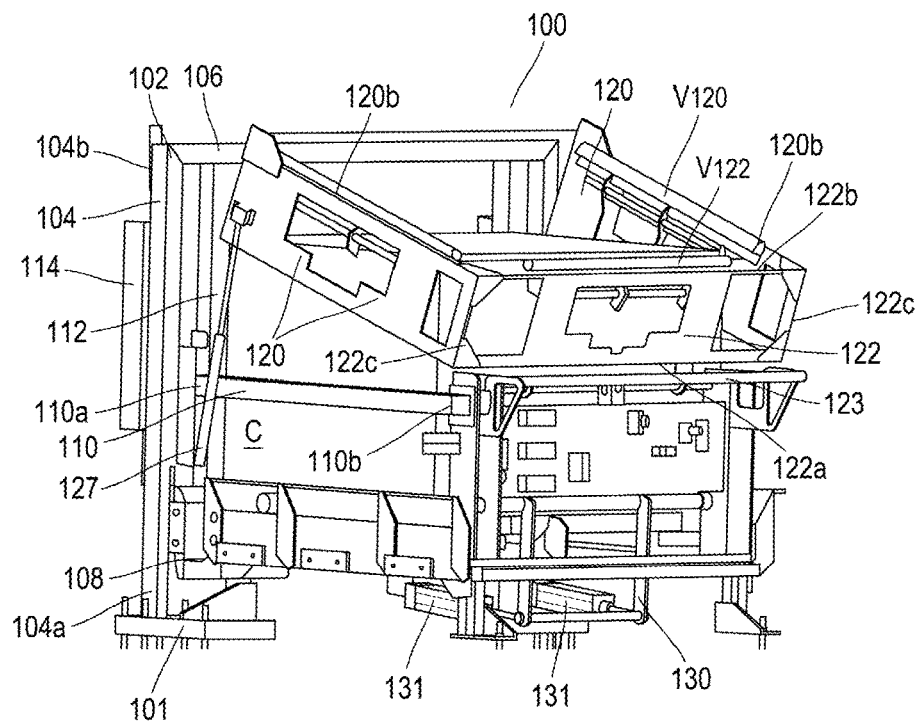

[Fig 9]
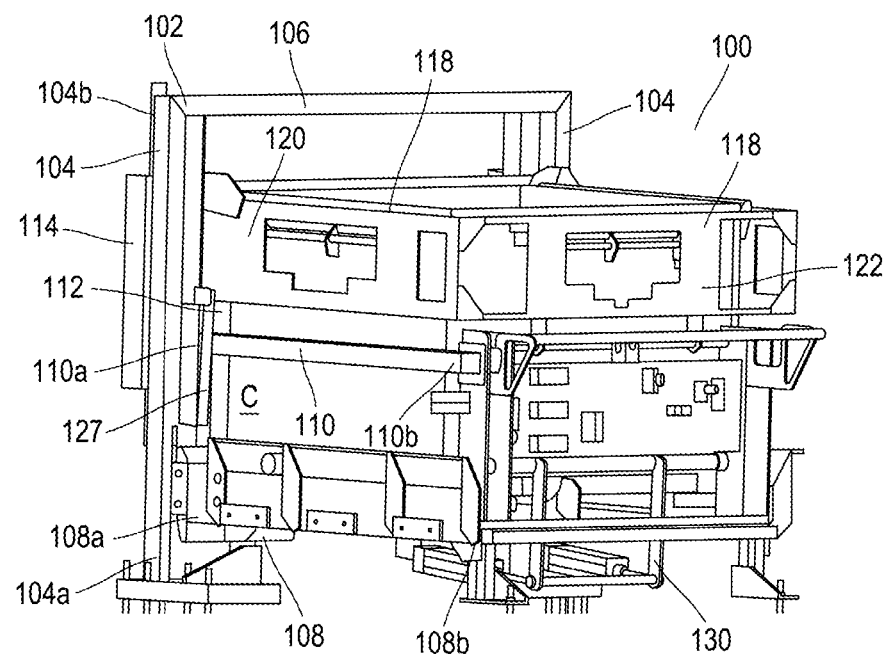

[Fig 10]
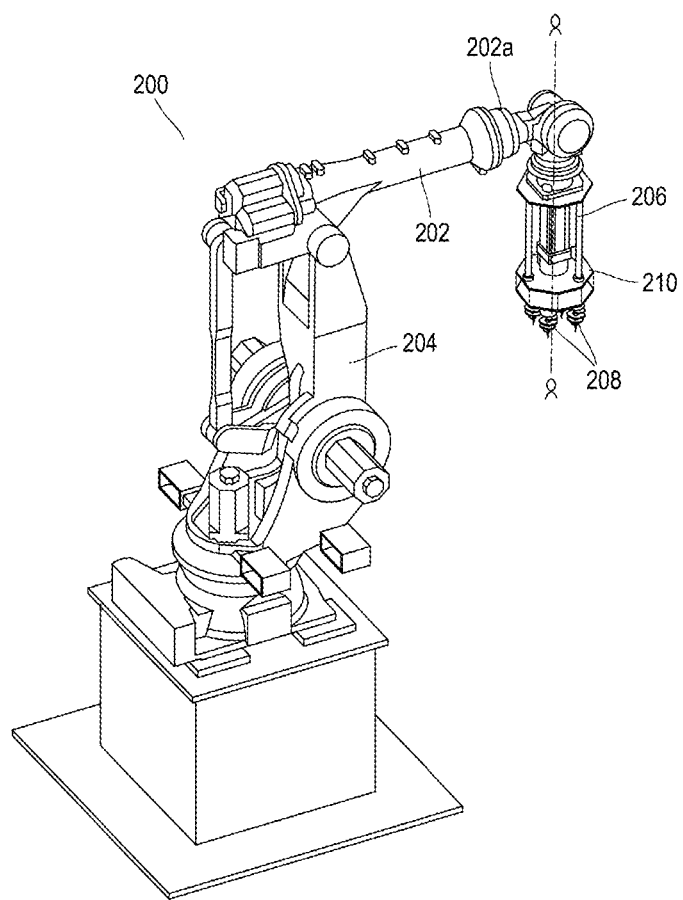

AUTOMATED CELL FOR PERFORMING CONTAINER CONTROL DURING A PROCESS OF PICKING RUBBER BLOCKS

TECHNICAL DOMAIN

The invention relates to an automated cell and a clamping process performed by the cell to control containers in which rubber blocks of rubber mixtures are arranged without prior knowledge of their arrangement. The cell of the invention is part of a rubber product production facility that controls the allocation and transport of containers according to a process of picking the rubber blocks arranged (or "sorted") therein.

BACKGROUND

In the field of manufacturing rubber products (including tires), a rubber mixture can be selected from a variety of rubber mixtures that are mixed in different quantities and from a variety of recipes. Each rubber mixture incorporates different materials necessary to make the product, including, without limitation, elastomer(s) (e.g., natural rubber, synthetic elastomer, and combinations and equivalents thereof) and one or more ingredients, such as one or more processing agents, protective agents, and reinforcing fillers. The recipes thus require the mixing of "batches" of unvulcanized rubber (natural or synthetic) in predetermined mass proportions (i.e., "dosage").

Each batch has one or more types of rubber that, after mixing, give a rubber product the desired properties. In order to obtain the most homogeneous properties possible, a batch can be made up of different batches from different suppliers for the same type and grade of elastomer. For the same type and grade of elastomer, the properties of this elastomer can vary from one supplier to another and even from one batch to another for the same supplier. Each grade is typically supplied in blocks (or "bales") of gum (or "rubber") of predetermined weight and volume (as used herein, it is understood that the terms "gum" and "rubber" are interchangeable). There are arrangements of the rubber blocks that are grouped according to their common properties, which facilitates their handling and ensures their optimal storage in the available storage space.

Referring to FIG. 1, an embodiment of rubber block storage is shown in which one or more rubber blocks partially overlap one another. The rubber blocks may be randomly arranged in the container, with any orientation possible along all three dimensions. The rubber blocks may have "flowed" under their own weight, and thus may be randomly deformed. In addition, the incoming containers may be of different sizes and equipped (or not) with a plastic bag to protect the rubber blocks.

In this type of storage, the rubber blocks 10 are stacked in a container 12 with side portions 12a. It is understood that the term "container" includes crate(s) and/or other equivalent container(s) capable of performing an automated picking process on the rubber blocks (the container being selected from, for example, pallets, truck bodies, chained trucks, van bodies and the like). During a picking process, one or more rubber blocks are stored without knowledge of their arrangement in each container. It is understood that the term "picking" includes the functions of posing and picking up arranged (or "sorted") rubber blocks in a container or other dedicated space, as well as the target arrangement of the rubber blocks.

Although solutions exist for performing embodiments of the picking processes, there are as yet none developed specifically for controlling the containers themselves. Thus, the disclosed invention relates to a robotic cell capable of controlling, during a clamping process performed by the cell, a variety of containers in which rubber blocks of any type are arranged (diversity of colors, sizes, shapes, hardness, stickiness, marking and plastic protections, variety of rubber mixtures, etc.). The disclosed invention enables the picking of the rubber blocks arranged in the controlled containers, regardless of their properties (e.g. harder, softer, wrapped, unwrapped, etc.) and regardless of their orientations in the corresponding containers.

SUMMARY OF THE INVENTION

The invention is directed to an automated cell for controlling containers in which rubber blocks are arranged, characterized in that the cell includes:
  a frame that allows the fixed installation of the cell;
  an automatic centering system having a guiding means that allows precise positioning of a loaded container in a loading space of the cell;
  a clamping system having a holding means that maintains the positioning of the loaded container in the loading space of the cell; and
  a locking system having a locking means that assures maintenance of the positioning of the container in the loading space of the cell.

In some embodiments of the invention:
  the guiding means includes a pair of guides aligned at the cell entrance;
  the holding means includes a tiltable holding frame with a pivoting chassis mounted on the frame so that the chassis moves between a standby position, where the chassis remains tilted to allow loading and positioning of the container in a loading space of the cell, and a clamping position, where the chassis descends; and
  the locking means includes a barrier mounted on the frame such that the barrier moves between an unlocked position, where the barrier remains tilted to allow loading and positioning of the container in the loading space of the cell, and a locked position, where the barrier moves up to block and abut the container in a known plane.

In some embodiments of the invention, the guiding means includes a posing platform installed on the frame to provide a posing space where the container is held in the loading space. In some such embodiments of the invention, the platform includes at least one set of rollers for moving the container into the loading space.

In some such embodiments of the invention, the platform includes:
  an attachment means that allows the chassis to be moved between the standby position and the clamping position; and
  a clamping member for forming the tiltable holding frame.

In some embodiments of the invention, the chassis further includes a flap or flaps with each flap being pivotally moveable up and down.

In some embodiments of the invention, the cell further includes one or more sensors for collecting data corresponding to the container and its positioning relative to the loading space of the cell.

The invention is also directed to a clamping process performed by disclosed cells, characterized in that the process includes the following steps:

a step of positioning a container in the loading space of the cell, during which the chassis remains in the waiting position, and the barrier remains in the unlocking position;

a barrier locking step, during which the barrier moves from the unlocked position to the locked position to clamp the container the cell frame; and a clamping step, during which the chassis moves from the standby position to the clamping position to position the tiltable holding frame.

In some embodiments of the process, the clamping step further includes a step of lowering the flap(s) to engage the loaded container in the loading space of the cell.

In some embodiments of the process, the process further includes a step of measuring the physical environment containing the cell to arrive at an accurate positioning of the container.

The invention is further directed to a facility for producing rubber products, including:

the cell of the invention; and a robot including:

a gripping device supported by an elongated pivotal arm and extending from the elongated arm to a free end; and a gripper disposed at the free end of the gripping device, the gripper including one or more screws installed in a functional platform of the gripper;

whereby the robot is set in motion so that the gripper can perform a pickup of a target rubber block arranged in the container during a picking process performed by the robot. Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which:

FIG. 1 represents a schematic view of one embodiment of rubber block storage.

FIGS. 2 and 3 represent schematic perspective views of known embodiments of rubber blocks.

FIG. 4 represents a perspective view of an embodiment of an automated cell of the invention.

FIG. 5 represents a top view of the automated cell of FIG. 4.

FIG. 6 represents a rear perspective view of a tilting holding frame of the automated cell of FIGS. 4 and 5.

FIGS. 7, 8, and 9 represent steps in an embodiment of a clamping process performed by the automated cell of the invention.

FIG. 10 represents a perspective view of an embodiment of a robot that is part of a rubber product production facility incorporating the automated cell of the invention.

DETAILED DESCRIPTION

Referring now to the figures, and considering the type of rubber block storage that best utilizes the available storage space, it is necessary to consider the geometry of the rubber blocks being transported. FIGS. 2 and 3 show schematic diagrams of embodiments of a rubber block P, P' that include, in a representative manner, an outer surface having a top surface $S_P$, $S_{P'}$, an opposing bottom surface $I_P$, $I_{P'}$, two opposing sides $C_P$, $C_{P'}$ that define a length of the rubber block, and two opposing sides $C_{*P}$, $C_{*P'}$ that define its width.

The constitution of a rubber block P, P' is typically described by a representation of its constituents in a meridian plane, i.e., a plane containing the parallel X-axis, the perpendicular Y-axis, and the Z-axis perpendicular to any meridian plane. It is understood that each of these parameters may be expressed in equivalent known length measurements (e.g., millimeters (mm) or inches (in)). It is understood that the geometries of the rubber blocks P, P' are given as examples, with other geometries being addressed (e.g., rubber blocks that have flowed).

Referring now to FIGS. 4-9, in which the same numbers identify identical elements, FIG. 4 depicts an embodiment of an automated cell (or "cell") 100 of the invention. The cell 100 provides for the control of the containers in which the rubber blocks are arranged. The cell 100 may be part of a rubber product production facility (or "facility") for controlling the allocation and transportation of containers based on a process for picking arranged (or "sorted") rubber blocks therein.

It is understood that the term "picking" includes the functions of posing and picking up arranged rubber blocks from the container handled by the cell 100, as well as the target arrangement of the rubber blocks. It is understood that the term "target rubber block" (singular or plural) includes a rubber block that is present in the container and is identified for pickup during a picking process of the invention performed by a picking apparatus that is part of a rubber product production facility (e.g., a robot 200 as depicted and described below with reference to FIG. 10). It is understood that the term "target location" (singular or plural) includes a dedicated space where the target rubber blocks will be arranged (e.g., a belt, a conveyor, another container, a rack, etc.). The term "target arrangement" (singular or plural) includes a desired arrangement for the rubber blocks arranged in a target location (e.g., "stacked storage").

The cell 100 includes a clamping system, a container locking system (or "locking system"), and an automatic container centering system (or "centering system"). The clamping, locking and centering systems are incorporated into a frame 102 of the cell 100 that allows for the fixed installation of the cell (e.g., by support plates 101 and/or by fastening elements 103). One embodiment of the frame is shown as an example in FIGS. 4 to 9. It is understood that the configuration of the frame 102 can be modified according to the footprint of the cell 100 and/or the installation of which the cell is a part.

The embodiment of the frame 102 shown includes a pair of longitudinal members 104 spaced apart by a predetermined distance (e.g., a distance to allow loading of a container of corresponding dimensions into the cell 100). Each member 104 extends along a predetermined length between an attachment end 104a and an opposite end 104b. A cross bar 106 may join the opposite ends 104b of the members 104 to define an entrance that allows loading of a container into the cell 100.

The frame 102 also includes a pair of lower supports 108 and a pair of upper supports 110 that extend substantially perpendicular to each member 104. Each pair of lower, upper supports 108, 110 is arranged in parallel with each other along the length of each member 104 and aligned with the corresponding supports. Each lower, upper support 108, 110 extends along a predetermined length between a respective attachment end 108a, 110a, where the support is attached to a corresponding member 104, and a respective opposite free end 108b, 110b (the lengths of the supports being substantially equal). The lower, upper supports 108, 110, together with the members 104, together define a loading space 112 of a container posed in the cell 100 during a clamping process performed by the cell. It is understood that the number and precise positioning of lower, upper supports 108, 110 may be varied and are not limited to the embodiment shown in the figures.

The centering system of the cell 100 includes a guiding means that allows for precise positioning of the container loaded in the loading space 112 of the cell. In one embodiment of the cell 100, the guiding means includes a pair of guides 114 aligned at the cell entrance, with one guide 114 being installed along the length of each member 104 (e.g., relative to mechanical stop(s) 115 as shown in FIG. 4). In one embodiment of the cell 100, the guiding means also includes a removal platform (or "platform") 116 installed on the frame 102 along the bottom supports 108. The platform 116, together with the frame 102, provides a drop-off space where the container is controlled and held in the loading space 112. In one embodiment, the platform 116 includes at least one series of rollers 116a for moving the container into the loading space 112 (see FIGS. 4 and 5). It is understood that the number of series of rollers, the number of rollers in each series, and their arrangement may be varied depending on the containers being controlled.

Referring again to FIGS. 1 through 9, and particularly to FIG. 6, the cell clamping system 100 includes a pivoting frame (or "chassis") 118 installed on the frame 102. The chassis 118 includes two lateral sides 120, a longitudinal side 122, and a clamping member 124 that together form a tiltable, substantially rectangular holding frame for a container loaded into the loading space 112 of the cell. In instances where a plastic bag is held around one or more rubber blocks during loading of the container into the cell 100, the frame 118 holds the container and the plastic bag.

The lateral sides 120 of the chassis 118 are substantially parallel, and each lateral side 120 includes a bottom edge $120a$ and a top edge $120b$ extending between a starting end $120_D$ and an opposite stopping end $120_{AR}$ (see FIG. 6). The starting end $120_D$ of each lateral side 120 is aligned with a corresponding element 104 of the frame 102 so that the lateral sides 120 are spaced apart by a predetermined distance corresponding to the dimensions of the frame.

The longitudinal side 122 joins the stop ends $120_{AR}$ of the lateral sides 120, and the clamping member 124 joins the start ends $120_D$ to form the tiltable holding frame. The longitudinal side 122 includes a lower edge $122a$ and an upper edge $122b$ extending between two opposing ends $122c$. The longitudinal side 122 incorporates a fastening means 123 along the lower edge $122a$ that allows the chassis 118 to be tilted between a standby position (where the chassis 118 remains tilted to allow for loading and positioning of a container in the loading space 112 of the cell 100) (see FIGS. 7 and 8) and a clamping position (where the chassis 118 descends) (e.g., to clamp the container's plastic bag, if present) (see FIG. 9). The chassis 118 is tilted between the standby position and the clamping position by an actuator(s) 127 (or equivalent actuator(s) of the clamping system). Each actuator 127 may be operated by hydraulic, pneumatic, or equivalent means.

In one embodiment of the cell 100, the chassis 118 also includes one or more pivotal flaps (or "flaps") that can pivotally move up and down. In the embodiment shown, one or more side flaps $V_{120}$ are installed along the top edge $120b$ of each side 120. In this embodiment, a longitudinal flap $V_{122}$ may be installed along the upper edge $122b$ of the longitudinal side 122. In one embodiment of the chassis 118, each lateral and longitudinal flap $V_{120a}$, $V_{120b}$ includes a rubber strip that protects it from impact. Each side and longitudinal flap $V_{120a}$, $V_{120b}$ pivotally moves up and down allowing a plastic bag to be pressed against a corresponding container packed in the plastic bag. Thus, the plastic bag is held in place to prevent it from obstructing a picking area during a process of picking the rubber blocks arranged in the container loaded in the cell 100. Each side and longitudinal flap $V_{120a}$, $V_{120b}$ is pivoted by clamping cylinder(s) 129 (or equivalent clamping system actuator(s)). Each clamping cylinder 129 may be actuated by hydraulic, pneumatic or equivalent means. In embodiments of the cell 100 incorporating a pivoting flap or flaps, the container is held in its intended position in the cell 100 without damage to the chassis 118, regardless of the presence of a plastic bag.

Extraction of the rubber blocks from the container generates a significant amount of force that can lift and/or move the container. Therefore, the cell 100 includes the locking system incorporating a pivoting barrier 130 that secures the container in the loading space 112 of the cell. Referring again to FIGS. 1 through 8, and particularly to FIG. 5, the barrier 130 is installed on the frame 102 proximate to the free ends $108b$ of the lower supports 108. The barrier 130 pivots up and down allowing it to be tilted between an unlocked position (where the barrier 130 remains tilted to allow loading and positioning of the container in the loading space 112 of the cell 100)(see FIG. 7)) and a locked position (where the barrier 130 moves up to block and abut the container in a known plane)(see FIG. 8)). Thus, the locking system maintains the container in the loading space 112 even during the cycles of picking the rubber blocks arranged in the containers. The barrier 130 pivots between the unlocked position and the locked position in response to a clamping cylinder(s) 131 (or equivalent actuator(s) of the locking system). Each clamping cylinder 131 may be actuated by hydraulic, pneumatic or equivalent means.

Referring again to FIGS. 1-9, the cell 100 further includes sensor(s) for collecting data corresponding to the container (e.g., its dimensions) and its positioning relative to the loading space 112 of the cell 100. It is understood that the term "sensor" (singular or plural) may refer to one or more devices (including photos, cameras, and/or optical sensors). These devices may be configured to perform two-dimensional (2D) and/or three-dimensional (3D) image sensing, 3D depth sensing, and/or other types of sensing of the physical environment. Using the captured data, the operation of the clamping, locking, and centering systems of the cell 100 is well-managed in real time.

In one embodiment, the sensors may include one or more detection sensors 133 that detect the presence of a container in the loading space 112 of the cell 100. The detection sensors 133 may be selected from commercially available sensors (e.g., reflector-type sensors)(see dotted line A in FIG. 5). Detection of a container in the loading space 112 may trigger a clamping process performed by the cell 100, which involves control of the clamping, locking and centering systems. The sensors may further include one or more calibration sensors 135 that manage the calibration of a vision system of the cell 100 (e.g., a 2D/3D type vision system)(see FIG. 5). The detection sensors 133 and calibration sensors 135 may be attached to the frame 102 (e.g., along a member(s) 104, along a length of a lower, upper support(s) 108, 110, and/or along the platform 116). The sensors may further include a clamping sensor(s) 137 installed on the barrier 130 to trigger its tilt during a clamping process performed by the cell 100.

It is understood that the detection sensors 133, the calibration sensors 135, and the clamping sensors 137 are provided as examples. Other sensors with other functions may be provided for use with the cell 100 to perform the clamping processes based on the properties of the container (e.g., its dimensions, positioning, rubber block arrangement, presence or absence of plastic bags, etc.).

In a rubber product production facility incorporating the cell 100, the data collected by the sensors can be used in the control of an apparatus that performs the picking of the target rubber blocks arranged in the container. Referring to FIG. 10, one embodiment of such an apparatus includes a robot 200 that performs a process of picking the rubber blocks arranged in the container. The robot 200 may include a sensing system that uses one or more sensors (not shown) to gather information about the physical environment around the robot. It is understood that the terms "sensor," "camera," "camera," and "optical sensor" may be used interchangeably and may refer to one or more devices configured to perform two-dimensional (2D) and/or three-dimensional (3D) image sensing, 3D depth sensing, and/or other types of sensing of the physical environment.

The robot 200 may be a static robot or a mobile robot. By "mobile" it is understood that the robot 200 may be set in motion either by integrated motion means (e.g., integrated motor(s)) or by non-integrated motion means (e.g., stand-alone mobile cart(s) or other equivalent mobile means). It is understood that the robot 200 may be attached to a floor, ceiling, wall, or any support that allows the picking process of the invention to be performed by the robot 200. It is understood that the robot 200 may be a conventional industrial robot or a collaborative robot or even a delta or cable robot. In one embodiment, the robot 200 can be of the "Cartesian" type that allows the control of its movement in cases where the containers are positioned in a corresponding manner.

Referring again to FIG. 10, the robot 200 includes a gripping device 202 supported by a pivotable elongated arm 204. The gripping device 202 extends from the elongated arm 204 to a free end 202*a* where a gripper 206 is disposed along a longitudinal axis 1-l. The robot 200 is set in motion so that the gripper 206 can perform a pickup of a target rubber block during a picking process performed by the robot. The initial positioning of the robot 200 and the initial orientation of the gripper 206 may be determined from data obtained via image acquisition and the physical environment in which the robot 200 operates relative to the cell 100. Sensors of the sensing system incorporated with the robot 200 may be attached to the elongated arm 204 and/or the robot gripper 206.

The gripper 206 includes one or more screws 208 installed in a functional platform 210 of the gripper such that each of the screws can be rotated. The screws 208 may be integrated, or they may be removable, with respect to the functional platform 210. The functional platform 210 allows the screw(s) 208 to be installed in a substantially equilateral geometry (e.g., a substantially square shape). The number of screws 208 is adjustable to enable quick mounting and dismounting of the screws as needed for the process of picking the intended rubber block. One or more screws 208 may be installed on the gripper 206 to optimize its gripping ability (e.g., to match the grip to the dimensions of the target rubber block), to optimize the holding force of the target rubber block, and to have the ability to grip one or more rubber blocks at a time with an adjustable number of screws.

In a rubber product production facility incorporating the cell 100 and the robot 200, a vision system (not shown) may be used to detect the presence of an arrangement of rubber blocks within the field of view of a camera of the vision system, thereby triggering the camera to capture the image of the rubber block(s). In cases where a portion of the target rubber block is not visible in the camera image, an arbitrary point may be placed at a known position relative to the sensor of the sensing system (e.g., at a known horizontal distance and a known vertical distance from the sensor position).

Thus, the sensors in the cell 100 and the sensors in the robot 200 may provide the physical environment information that may be used by a control system (that includes, for example, software for scheduling clamping of the cell 100 and/or corresponding movements of the robot 200). The control system could be in remote communication. In embodiments, one or more sensors mounted on the robot 200 (including, without limitation, navigation sensors) may be integrated to form a digital model of the physical environment (including, where applicable, the side(s), floor and ceiling). Using the obtained data, the control system can provoke movement of the robot 200 so as to navigate among target rubber block picking positions, based on the positioning of the container in the loading space 112.

Referring again to FIGS. 1 to 9, and particularly to FIGS. 7 to 9, a detailed description is given as an example of a clamping process (or "process") of the invention performed by the cell 100 (or by a facility incorporating the cell 100).

In initiating a clamping process of the invention, the process includes a step of positioning a container C in the loading space 112 of the cell 100 (see FIG. 7). During this step, the chassis 118 remains in the standby position, and the barrier 130 remains in the unlocked position. In embodiments where the frame 102 incorporates the platform 116, the platform 116 (with or without rollers 116*a*) guides the container C onto the platform during this step. During this step, the facility of which the cell 100 is a part is shut down and secured to allow uninterrupted access to the container C. The clamping station can be supplied and unloaded with containers by automatic handling means (for example, of the AGV/RGV type) but also by any other manual or semi-automatic handling means.

The clamping process further includes a locking step to press the container C against the frame 102 of the cell 100 (see FIG. 8). During this step, the detection of the presence and the correct positioning of the container (performed, for example, by the detection sensors 133, the calibration sensors 135 and/or the clamping sensors 137) allows the displacement of the barrier 130 from the unlocking position (see FIG. 7) to the locking position (see FIG. 8) in order to block and stop the container C. This configuration, which ensures that the container C is held in the loading space 112, also optimizes a working area of a device that treats the rubber blocks arranged in the container (for example, the robot 200 of FIG. 10).

In embodiments of the cell 100 incorporating side flaps $V_{120a}$ and/or a longitudinal flap $V_{1201b}$, the locking step further includes a step of lowering the flaps to come to rest against the corresponding container C. In cases where there is a plastic bag, the flap(s) come to rest against the plastic bag to hold it in place.

The clamping process of the invention includes a final clamping step to position the tilting holding frame (see FIG. 9). During this step, the chassis 118 moves from the standby position (see FIGS. 7 and 8) to the clamping position (see FIG. 9) to press the container against the frame 102 and to clamp the plastic bag of the container (if present).

In an embodiment of the clamping process of the invention, one or more steps of the process may further include a step of scanning the physical environment containing the cell 100. In embodiments of the process, this step further includes a step of measuring the physical environment containing the cell 100 to arrive at an accurate positioning of the container C. During this step, the rubber product production facility and/or an apparatus for picking a rubber block (e.g., robot 200) may use one or more sensors to capture data corresponding to the clamped containers and arranged rubber blocks to determine the shapes and/or positions of the individual rubber block. This information is relevant to understanding the arrangement of the arranged rubber blocks and to determining the best candidate for picking among the arranged rubber blocks. This best candidate selection strategy allows for accurate modeling of the clamping process to optimize the time of an associated picking cycle.

A cycle of the clamping process of the invention may be made by the PLC control and may include pre-programming of control information. For example, a process setting may be associated with the inclination that is provided to the cell 100, and/or the properties of the mixture of the rubber blocks arranged in a container controlled by the cell 100 (including the properties of a rubber type(s) associated with the corresponding containers and/or the presence of plastic bags). The cell 100 (and/or a system incorporating the cell 100) can easily repeat one or more steps of the clamping process in a specified order to properly provide the rubber blocks to achieve a desired batch.

The cell 100 (and/or a system incorporating the cell 100) may include pre-programming of control information. For example, a process setting may be associated with parameters of typical physical environments in which the cell operates. In embodiments of the invention, the cell 100 (and/or a facility incorporating the cell 100) may receive voice commands or other audio data representing, for example, a step or stop of the cell 100 and/or a loading/unloading of the container from the loading space 112. The request may include a request for the current status of a cycle of an automatic recognition process. A generated response may be represented audibly, visually, tactilely (e.g., using a haptic interface) and/or in virtual and/or augmented manners. This response, together with corresponding data, may be entered into a neural network.

For all embodiments of the cell 100, a monitoring system could be implemented. At least a portion of the monitoring system may be provided in a wearable device such as a mobile network device (e.g., a cell phone, a wearable computer, wearable network-connected device(s) (including "augmented reality" and/or "virtual reality" devices), wearable network-connected clothing, and/or any combinations and/or any equivalents).

In an embodiment, the process may include a step of training the cell 100 (or training a system incorporating the cell 100) to recognize values representative of the containers and/or the nature of rubber blocks associated with the containers controlled by the cell 100 (e.g., temperature and viscosity values) and to make a comparison with target values (e.g., to make a batch incorporating the picked rubber blocks). This step may include the step of training the cell 100 to recognize non-equivalences between the compared values. Each training step may include a classification generated by self-learning means. This classification may include, but is not limited to, the parameters of the selected batches, the container configurations, the durations of the clamping process cycles, and the expected values at the end of a cycle in progress (e.g., the weight of rubber blocks posed in the target location to achieve a desired batch).

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. An automated cell for controlling containers in which rubber blocks are arranged, the cell comprising:
a frame that allows the fixed installation of the cell;
an automatic centering system comprising a guiding means that allows positioning of a loaded container in a loading space of the cell;
a clamping system comprising a holding means that maintains the positioning of the loaded container in the loading space of the cell; and
a locking system comprising a locking means that ensures the maintenance of the positioning of the container in the loading space of the cell,
wherein the guiding means comprises a pair of guides aligned at the entrance to the cell
wherein the holding means comprises a tiltable holding frame with a pivotable chassis mounted on the frame such that the chassis moves between a standby position, where the chassis remains tilted to allow loading and positioning of the container in a loading space of the cell, and a clamping position, where the chassis descends,
wherein the locking means comprises a barrier mounted on the frame such that the barrier moves between an unlocked position, where the barrier remains tilted to allow loading and positioning of the container in the loading space of the cell, and a locked position, where the barrier moves up to lock and abut the container in a known plane, and
wherein the chassis comprises:
a securing means that allows the chassis to be moved between the standby position and the clamping position;
a clamping member for forming the tiltable holding frame; and
one or more flaps, each flap being pivotally moveable up and down.

2. The cell of claim 1, wherein the guiding means comprises a platform installed on the frame to provide a space where the container is held in the loading space.

3. The cell of claim 2, wherein the platform comprises at least one set of rollers for moving the container into the loading space.

4. The cell of claim 1, further comprising sensor(s) for collecting data corresponding to the container and its positioning relative to the loading space of the cell.

5. A clamping process performed by an automated cell for controlling containers in which rubber blocks are arranged, the automated cell comprising:
a frame that allows the fixed installation of the cell;
an automatic centering system comprising a guiding means that allows precise positioning of a loaded container in a loading space of the cell;
a clamping system comprising a holding means that maintains the positioning of the loaded container in the loading space of the cell; and a locking system comprising a locking means that ensures the maintenance of the positioning of the container in the loading space of the cell, and the process comprising the following steps:

a step of positioning a container in the loading space of the cell, during which the chassis remains in the standby position, and the barrier remains in the unlocked position;

a step of locking the barrier, during which the barrier moves from the unlocked position to the locked position to press the container against the frame of the cell; and a clamping step, during which the chassis moves from the standby position to the clamping position to position the tiltable holding frame, wherein the locking step further comprises a step of lowering one or more flaps to engage the container posed in the loading space of the cell.

6. The clamping process of claim 5, further comprising a step of measuring the physical environment containing the cell to arrive at an accurate positioning of the container.

* * * * *